United States Patent
Li

(10) Patent No.: US 9,322,520 B1
(45) Date of Patent: Apr. 26, 2016

(54) PORTABLE MULTI-FUNCTIONAL LIGHT EMITTING DEVICE

(71) Applicant: I-Lung Li, New Taipei (TW)

(72) Inventor: I-Lung Li, New Taipei (TW)

( * ) Notice: Subject to any disclaimer, the term of this patent is extended or adjusted under 35 U.S.C. 154(b) by 48 days.

(21) Appl. No.: 14/527,786

(22) Filed: Oct. 30, 2014

(51) Int. Cl.
*F21L 4/08* (2006.01)
*F21V 31/00* (2006.01)
*F21V 23/04* (2006.01)
*F21V 23/00* (2015.01)
*F21V 23/02* (2006.01)
*F21V 8/00* (2006.01)
*F21V 33/00* (2006.01)
*F21W 131/10* (2006.01)
*F21Y 113/00* (2006.01)

(52) U.S. Cl.
CPC .............. *F21L 4/085* (2013.01); *F21V 23/004* (2013.01); *F21V 23/02* (2013.01); *F21V 23/04* (2013.01); *F21V 31/005* (2013.01); *F21V 33/008* (2013.01); *G02B 6/0011* (2013.01); *F21W 2131/10* (2013.01); *F21Y 2113/005* (2013.01)

(58) Field of Classification Search
CPC ........ F21L 4/085; F21V 23/004; F21V 23/02; F21V 23/04; F21V 31/005; F21V 33/008; G02B 6/0011
See application file for complete search history.

(56) References Cited

U.S. PATENT DOCUMENTS

| | | | |
|---|---|---|---|
| 6,511,214 B1 * | 1/2003 | Parsons | A44B 15/005 362/116 |
| 7,740,368 B2 | 6/2010 | Chiang | |
| 2011/0122609 A1 * | 5/2011 | Dahlin | F21L 4/027 362/184 |
| 2015/0292691 A1 * | 10/2015 | Li | F21L 4/085 362/158 |

* cited by examiner

*Primary Examiner* — Mary Ellen Bowman
(74) *Attorney, Agent, or Firm* — Leong C. Lei

(57) ABSTRACT

A portable multi-functional light emitting device includes a first cover, a transparent waterproof cover, an illumination module, a second cover and a light guide member. Both illumination module and transparent waterproof cover are installed in the first cover, and the first cover is integrally combined with the second cover, so that the illumination module achieves both waterproof and translucent effects by the transparent waterproof cover. This device with a small volume is convenient to carry, and the second cover is connected to a PET bottle or a circular rod-shaped light guide member, and the illumination module provides an illumination required in outdoor activities or a warning light effect.

10 Claims, 6 Drawing Sheets

PORTABLE MULTI-FUNCTIONAL LIGHT EMITTING DEVICE

BACKGROUND OF THE INVENTION

1. Field of the Invention

The present invention relates to the field of warning equipments, and more particularly to a portable multi-functional light emitting device with a small volume, full functions and easy-to-carry features, and having a light guide member with different functions for different purposes.

2. Description of the Related Art

For outdoor activities, we generally carry various types of illumination devices with us for the illumination and emergency situations, and the illumination devices of this sort include head lamp, flash light and spot light or any other neon lamp with special illumination functions. These illumination devices come with different sizes and volumes. For the large-sized spot light or neon light, it is inconvenient to carry, and most of the present portable illumination devices are primarily head lamps and flash lights.

As disclosed in U.S. Pat. No. 7,740,368 B2 entitled "Cap with a light emitting diode (LED) for illuminating a beverage container", the LED illuminating cap applied in the beverage container comprises a lens, an LED light source, a battery, a control circuit board, a control button and a transparent chassis. The LED light source is installed between the cap and the lens, so that the LED light source is positioned downwardly for projecting light towards the lens, and the control circuit board is powered on by the battery to drive the LED light source, and the control button is installed at the cap, and the transparent chassis serves as the base of the lens. The transparent chassis is detachably coupled to the beverage container for the illumination purpose.

However, the LED illuminating cap is applicable to a general beverage container only. With the concave-and-convex design of the surface of the beverage container and the refraction/reflection of the beverage, light is illuminated. However, such arrangement still has the drawbacks of low power endurance and inconvenient change of battery. In addition, users need to carry a beverage container for its use, and thus causing inconvenience to users.

SUMMARY OF THE INVENTION

In view of the aforementioned problems of the prior art, it is a primary objective of the present invention to provide a portable multi-functional light emitting device, wherein a first cover and a second cover are engaged with each other, covered by an illumination module, and installed onto a light guide member such as a PET bottle or a circular rod. The illumination module generates different lights for the purposes of illumination, warning or decoration and projects the lights to the light guide member, so as to improve the convenience of use significantly. In addition, a keychain is installed to a surface of the first cover to facilitate users to carry the keychain. The second cover may have a rib disposed on a surface of the second cover to facilitate users to change to a different light guide member.

To achieve the aforementioned objective, the present invention provides a portable multi-functional light emitting device, comprising: a first cover, including a first connecting portion disposed at an end of the first cover, a second connecting portion disposed at the other end of the first cover, and a ring-shaped retaining wall disposed between the first connecting portion and the second connecting portion; a transparent waterproof cover, including a ring-shaped flange corresponsive to the ring-shaped retaining wall and provided for embedding into the first cover, and a waterproof silicon ring clamped between the ring-shaped flange and the ring-shaped retaining wall, so that an accommodating space is formed after the first cover and the transparent waterproof cover are combined; an illumination module, installed in the accommodating space, and comprised of at least one LED light source, a control circuit board and a power supply, and the LED light source and the power supply being electrically coupled to the control circuit board, and the control circuit board having a switch for controlling an illumination status of the LED light source; a second cover, including a third connecting portion disposed at an opening of the second cover and corresponsive to the first connecting portion and provided for covering and sealing a side of the first cover, and the second cover, and a penetrating hole corresponsive to the switch; and a light guide member, including a fourth connecting portion disposed at an end of the light guide member and corresponsive to the second connecting portion and provided for combining the light guide member and the first cover as a whole, and the illumination module is provided for driving the light guide member to emit light.

In a preferred embodiment, the light guide member is a PET bottle, and the third connecting portion is a thread corresponsive to the PET bottle and provided for screwing the first cover onto the PET bottle. With the waterproof design of the present invention, the PET bottle provides illumination light for camping after it is filled with water. In addition, the present invention also provides a design with an adapter ring to fit different sizes of the PET bottles, wherein the adapter ring has an outer thread portion disposed at an outer portion of the adapter ring and corresponsive to the third connecting portion, an inner thread portion disposed at an inner portion of the adapter ring and corresponsive to the PET bottle, so that the adapter ring may be screwed between the first cover and the PET bottle for installing the PET bottle of a different size.

In another preferred embodiment, the light guide member is a circular-rod structure and made of a translucent material, and the light guide member includes a light collecting portion disposed at an end of the fourth connecting portion, and a refracting/reflecting portion disposed at the other end of the fourth connecting portion. The light guide member provides an illumination effect like a flash light or a warning effect like a warning rod.

In the portable multi-functional light emitting device of the present invention, a charging port is provided for the charging purpose, wherein the charging port is installed on a surface of the second cover and electrically coupled to the power supply for charging the power supply without the need of changing the battery frequently, and the charging port may be combined with a general mobile power supply for use. The charging port is one selected from the collection consisting of USB, MINI USB and MICRO USB ports.

To facilitate users to carry, the portable multi-functional light emitting device of the present invention further adds a keychain, and a holding portion is protruded from the second cover, and the holding portion has a through hole for coupling the keychain, so that the keychain may be worn onto a user's body or backpack. In addition, the keychain is comprised of a first collar, a winding box and a second collar, and the first collar is coupled to a surface of the winding box, and an extending sling is disposed around the interior of the winding box, and the second collar is coupled to an end of the extending sling, so that the second collar is capable of stretching or retracting with respect to the winding box to facilitate users to extend the length of the keychain for use or reduce the length for an easy storage.

The illumination module includes a first LED light source, a second LED light source and a third LED light source, and the switch is provided for switching to a different LED light source to emit a different light. For example, the first LED light source is a white light LED for emitting white light, the second LED light source is a yellow light LED for emitting a yellow light, and the third LED light source is a polymorphic LED for emitting different color lights alternately.

To facilitate users to change to a different light guide member, at least one rib is formed at an outer surface of the first cover for increasing the resistance of the rotation, so as to facilitate the users to change the light guide member.

DETAILED DESCRIPTION OF THE PREFERRED EMBODIMENTS

Figure 1:
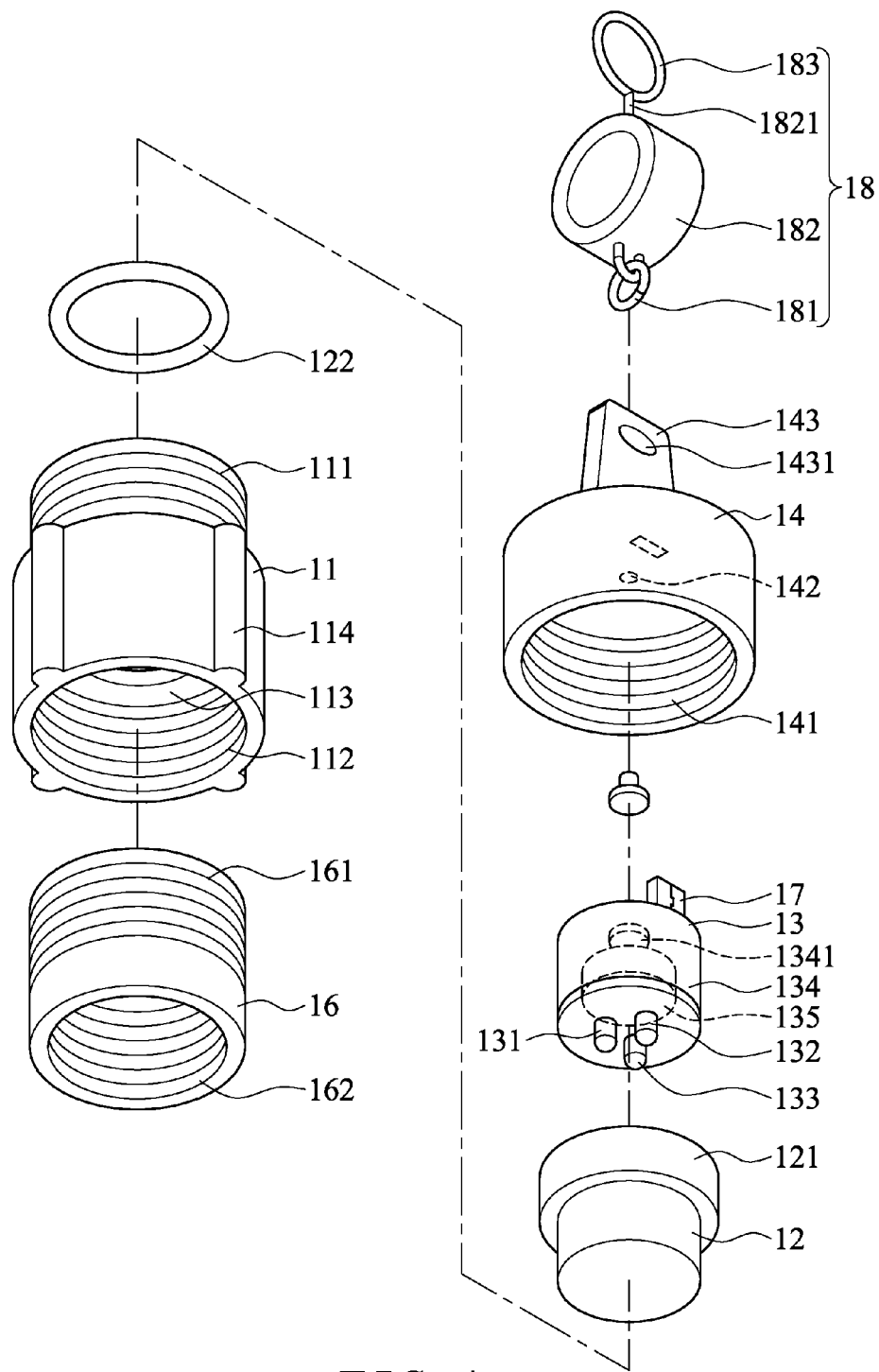
FIG. 1 is an exploded view of a first preferred embodiment of the present invention.
Figure 2:
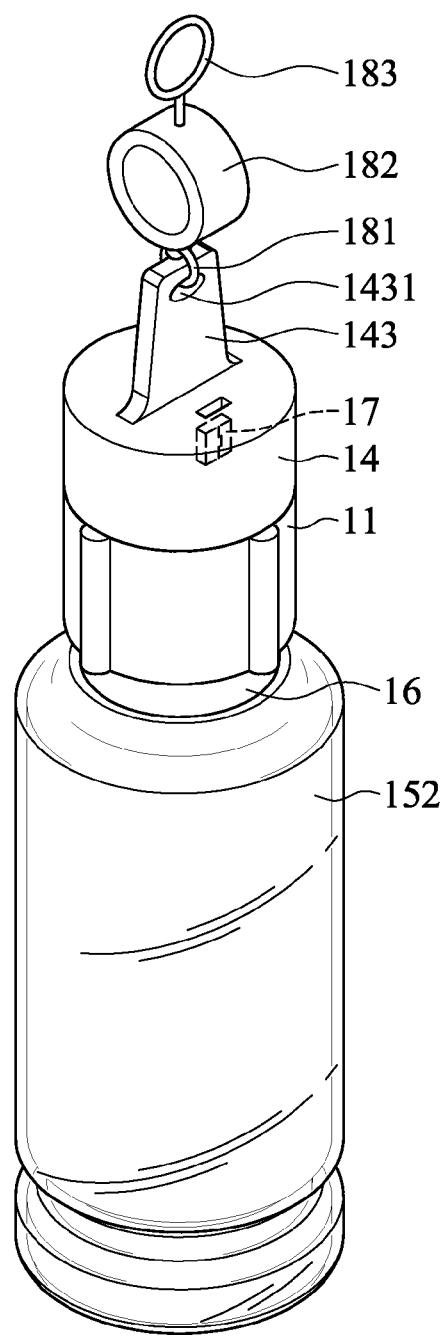
FIG. 2 is a perspective view of an assembled structure of the first preferred embodiment of the present invention.
Figure 3:
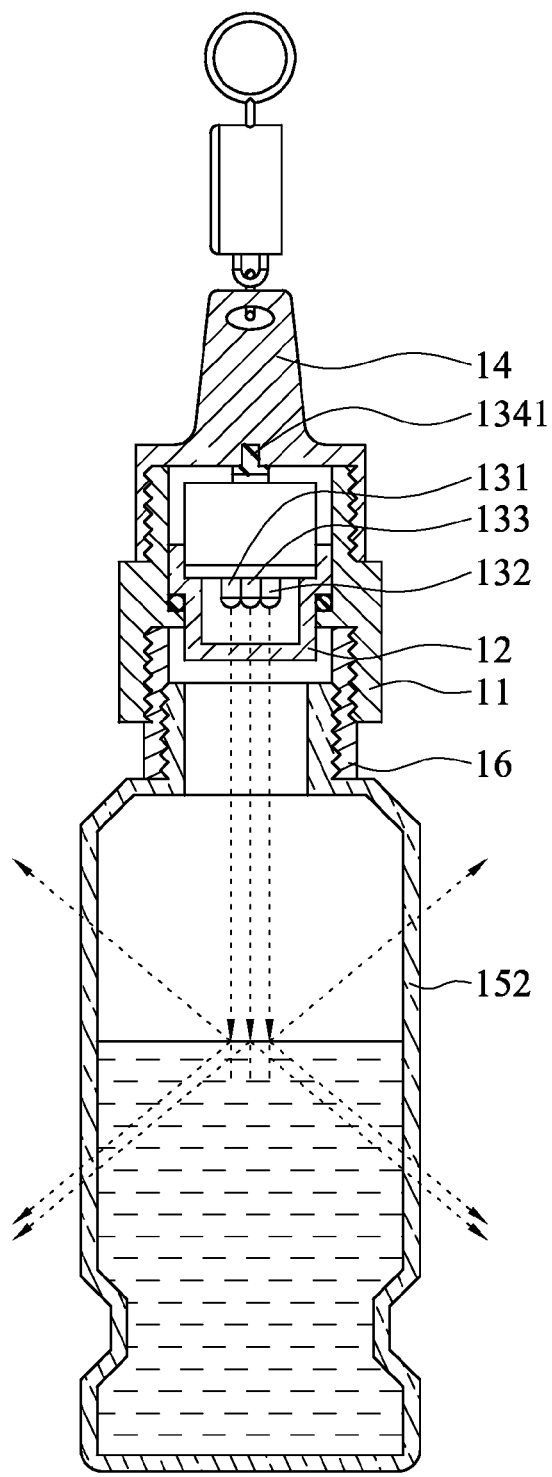
FIG. 3 is a schematic view of a using status of the first preferred embodiment of the present invention.
Figure 4:
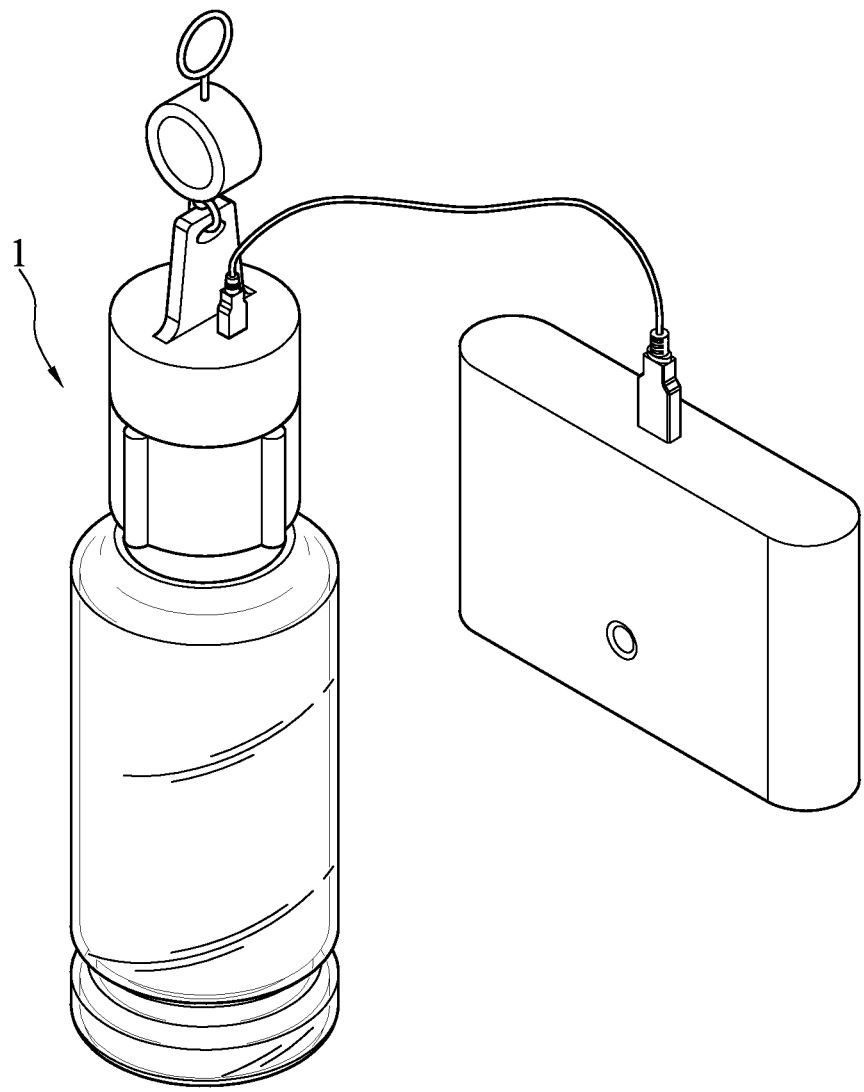
FIG. 4 is a schematic view of a charging status of the first preferred embodiment of the present invention.

The aforementioned and other objectives, technical characteristics and advantages of the present invention will become apparent with the detailed description of preferred embodiments and the illustration of related drawings as follows.

With reference to FIGS. 1 to 4 for an exploded view and a perspective view of a first preferred embodiment, and schematic views of a using status and a charging status of a portable multi-functional light emitting device in accordance with the first preferred embodiment of the present invention respectively, the portable multi-functional light emitting device 1 comprises a first cover 11, a transparent waterproof cover 12, an illumination module 13, a second cover 14 and a light guide member 15.

The first cover 11 includes a first connecting portion 111 disposed at an end of the first cover 11, a second connecting portion 112 disposed at the other end of the first cover 11, and a ring-shaped retaining wall 113 disposed between the first connecting portion 111 and the second connecting portion 112, so as to form an annular structure with a hollow center, and a rib 114 is formed separately at symmetric positions on an outer surface of the first cover 11.

An end of the transparent waterproof cover 12 includes a ring-shaped flange 121 corresponsive to the ring-shaped retaining wall 113 and provided for embedding into the first cover 11, and a waterproof silicon ring 122 is clamped between the ring-shaped flange 121 and the ring-shaped retaining wall 113, so that an accommodating space (not shown in the figure) is formed after the first cover 11 and the transparent waterproof cover 12 are combined.

The illumination module 13 is comprised of a first LED light source 131, a second LED light source 132 and a third LED light source 133, a control circuit board 134 and a power supply 135, and the first LED light source 131, the second LED light source 132, the third LED light source 133 and the power supply 135 are electrically coupled to the control circuit board 134, and the control circuit board 134 includes a switch 1341 for controlling the illumination status of the first LED light source 131, the second LED light source 132, and the third LED light source 133 to switch one of the first LED light source 131, the second LED light source 132 and the third LED light source 133 to emit light. It is noteworthy that, the first LED light source 131 is a white light LED for emitting white light, and the second LED light source 132 is a yellow light LED for emitting yellow light, and the third LED light source 133 is a polymorphic LED for emitting different color lights alternately.

The second cover 14 includes a third connecting portion 141 disposed at an opening of the second cover 14 and corresponsive to the first connecting portion 111 and provided for covering and sealing a side of the second cover 14, and the second cover 14 further includes a penetrating hole 142, and a holding portion 143 is protruded from the top of the second cover, and the holding portion 143 includes a through hole 1431.

A fourth connecting portion 151 is disposed at an end of the light guide member 15 and corresponsive to the second connecting portion 112 and provided for combining the light guide member 15 and the first cover 11 as a whole. The light guide member 15 emits light through the illumination module 13. In this preferred embodiment, the light guide member 15 is a PET bottle 152, and the third connecting portion 141 is a thread corresponsive to the PET bottle 152 and provided for screwing and fixing the first cover 11 onto the PET bottle 152.

To fit the PET bottles having different sizes of their opening, an adapter ring 16 is provided, wherein an outer thread portion 161 is disposed at an outer portion of the adapter ring 16 and corresponsive to the third connecting portion 141, and an inner thread portion 162 is disposed at an inner portion of the adapter ring 16 and corresponsive to the PET bottle 152, so that the adapter ring 16 may be screwed between the first cover 11 and the PET bottle 152.

In addition, the portable multi-functional light emitting device 11 of the present invention further comprises a charging port 17 formed on a surface of the second cover 14 and electrically coupled to the power supply 135 for charging the power supply 135, wherein the charging port 17 is one selected from the collection consisting of USB, MINI USB and MICRO USB ports.

For an easy carry, the portable multi-functional light emitting device 11 of the present invention further comprises a keychain 18, and the keychain 18 is comprised of a first collar 181, a winding box 182 and a second collar 183, and the first collar 181 is coupled to a surface of the winding box 182, and an extending sling 1821 is disposed around the interior of the winding box 182, and the second collar 183 is coupled to an end of the extending sling 1821, so that the second collar 183 may be stretched or retracted with respect to the winding box 182.

It is noteworthy that, the first connecting portion 111, the second connecting portion 112, the third connecting portion 141 and the fourth connecting portion 151 of the present invention are threads. Of course, the design is not limited to threads only, but any sheathing or latching design may be adopted as well.

Figure 5:
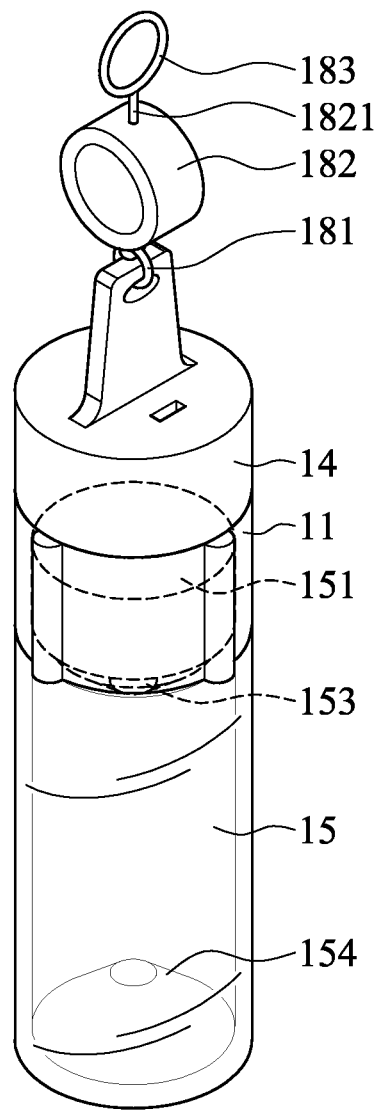
FIG. 5 is a perspective view of an assembled structure of a second preferred embodiment of the present invention.
Figure 6:
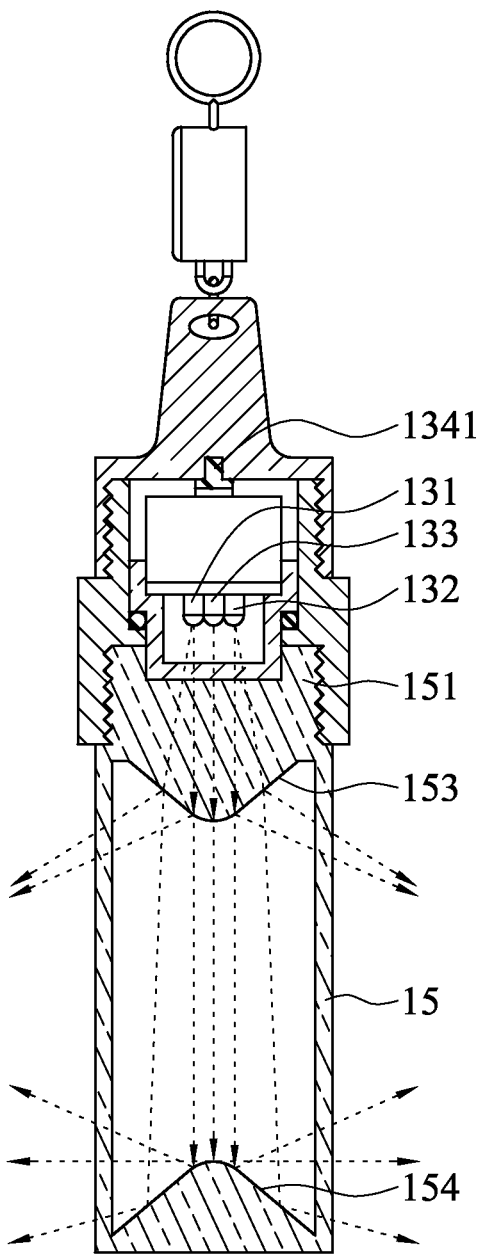
FIG. 6 is a schematic view of a using status of the second preferred embodiment of the present invention.

With reference to FIGS. 5 and 6 for a perspective view of the second preferred embodiment and a schematic view of a using status of the second preferred embodiment of the present invention respectively, this embodiment adopts a different light guide member 15, and the light guide member 15 is a circular rod shaped structure and made of a translucent material (such as an acrylic or transparent plastic material), and the light guide member 15 includes a light collecting portion 153 disposed at an end of the light guide member 15 and corresponsive to the fourth connecting portion 151, and a refracting/reflecting portion 154 disposed at the other end of the light guide member 15, so that the projected lights are collected by the light collecting portion 153 and then projected to the refracting/reflecting portion 154 before being diffused to the outside, so that the invention may serve as a flash light, a warning rod, or a cheering stick.

What is claimed is:

1. A portable multi-functional light emitting device, comprising:
   a first cover, including a first connecting portion disposed at an end of the first cover, a second connecting portion disposed at the other end of the first cover, and a ring-shaped retaining wall disposed between the first connecting portion and the second connecting portion;
   a transparent waterproof cover, including a ring-shaped flange corresponsive to the ring-shaped retaining wall and provided for embedding into the first cover, and a waterproof silicon ring clamped between the ring-shaped flange and the ring-shaped retaining wall, so that an accommodating space is formed after the first cover and the transparent waterproof cover are combined;
   an illumination module, installed in the accommodating space, and comprised of at least one LED light source, a control circuit board and a power supply, and the LED light source and the power supply being electrically coupled to the control circuit board, and the control circuit board having a switch for controlling an illumination status of the LED light source;
   a second cover, including a third connecting portion disposed at an opening of the second cover and corresponsive to the first connecting portion and provided for covering and sealing a side of the first cover, and the second cover, and a penetrating hole corresponsive to the switch; and
   a light guide member, including a fourth connecting portion disposed at an end of the light guide member and corresponsive to the second connecting portion and provided for combining the light guide member and the first cover as a whole, and the illumination module is provided for driving the light guide member to emit light.

2. The portable multi-functional light emitting device of claim 1, wherein the light guide member is a PET bottle, and the third connecting portion is a thread corresponsive to the PET bottle and provided for screwing the first cover onto the PET bottle.

3. The portable multi-functional light emitting device of claim 2, further comprising an adapter ring, an outer thread portion disposed at an outer portion of the adapter ring and corresponsive to the third connecting portion, an inner thread portion disposed at an inner portion of the adapter ring and corresponsive to the PET bottle, so that the adapter ring is screwed between the first cover and the PET bottle.

4. The portable multi-functional light emitting device of claim 1, wherein the light guide member is a circular-rod structure and made of a translucent material, and the light guide member includes a light collecting portion disposed at an end of the fourth connecting portion, and a refracting/reflecting portion disposed at the other end of the fourth connecting portion.

5. The portable multi-functional light emitting device of any one of claims 1, further comprising a charging port disposed at a surface of the second cover, and electrically coupled to the power supply for charging the power supply.

6. The portable multi-functional light emitting device of claim 5, wherein the charging port is one selected from the group of USB, MINI USB and MICRO USB ports.

7. The portable multi-functional light emitting device of claim 6, further comprising a keychain, and the second cover includes a holding portion protruded therefrom, and the holding portion has a through hole for coupling the keychain.

8. The portable multi-functional light emitting device of claim 7, wherein the keychain is comprised of a first collar, a winding box and a second collar, and the first collar is coupled to a surface of the winding box, and an extending sling is disposed around the interior of the winding box, and the second collar is coupled to an end of the extending sling, so that the second collar is capable of stretching or retracting with respect to the winding box.

9. The portable multi-functional light emitting device of claim 8, wherein the illumination module includes a first LED light source, a second LED light source and a third LED light source, and the first LED light source is a white light LED for emitting white light, and the second LED light source is a yellow light LED for emitting yellow light, and the third LED light source is a polymorphic LED capable of emitting different color lights alternately.

10. The portable multi-functional light emitting device of claim 8, wherein the first cover includes at least one rib formed on a surface of the cover for increasing the resistance of a rotation.

* * * * *